US008832729B2

(12) United States Patent
Nussel et al.

(10) Patent No.: US 8,832,729 B2
(45) Date of Patent: Sep. 9, 2014

(54) METHODS AND SYSTEMS FOR GRABBING VIDEO SURFERS' ATTENTION WHILE AWAITING DOWNLOAD

(75) Inventors: Dale Nussel, Mahomet, IL (US); Allie K. Watfa, Urbana, IL (US); Jonathan Kilroy, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 183 days.

(21) Appl. No.: 13/176,572

(22) Filed: Jul. 5, 2011

(65) Prior Publication Data
US 2013/0014182 A1  Jan. 10, 2013

(51) Int. Cl.
*H04N 7/025* (2006.01)
*H04N 21/40* (2011.01)
*H04N 21/262* (2011.01)
*H04N 21/442* (2011.01)
*H04N 21/61* (2011.01)
*H04N 21/81* (2011.01)
*H04N 21/431* (2011.01)

(52) U.S. Cl.
CPC ........... *H04N 21/8173* (2013.01); *H04N 21/40* (2013.01); *H04N 21/26241* (2013.01); *H04N 21/44222* (2013.01); *H04N 21/6125* (2013.01); *H04N 21/26233* (2013.01); *H04N 21/812* (2013.01); *H04N 21/4316* (2013.01)
USPC .................... 725/32; 725/33; 725/37; 725/86

(58) Field of Classification Search
USPC .......................................... 725/32, 33, 37, 86
See application file for complete search history.

(56) References Cited

U.S. PATENT DOCUMENTS

| | | | | |
|---|---|---|---|---|
| 6,304,852 B1 * | 10/2001 | Loncteaux | ................ | 705/14.68 |
| 2003/0030752 A1 * | 2/2003 | Begeja et al. | ................ | 348/563 |
| 2004/0261125 A1 * | 12/2004 | Ellis et al. | ..................... | 725/133 |
| 2006/0136964 A1 * | 6/2006 | Diez et al. | ....................... | 725/37 |
| 2007/0071208 A1 * | 3/2007 | Morris | ..................... | 379/201.02 |
| 2007/0288985 A1 * | 12/2007 | Candelore et al. | ............ | 725/132 |
| 2008/0133437 A1 * | 6/2008 | Shaw et al. | ..................... | 706/15 |
| 2009/0044223 A1 * | 2/2009 | Jiang et al. | ...................... | 725/40 |
| 2010/0178987 A1 * | 7/2010 | Pacey | .............................. | 463/42 |
| 2011/0239263 A1 * | 9/2011 | Kim et al. | ..................... | 725/110 |

* cited by examiner

*Primary Examiner* — Pankaj Kumar
*Assistant Examiner* — Timothy Newlin
(74) *Attorney, Agent, or Firm* — Mauriel Kapouytian Woods LLP; Lana Akopyan (57) ABSTRACT

Methods and systems are disclosed in which an estimated time a user will have to wait before a user selected video begins playing is calculated. The estimated time may be calculated based on, for example, speed of the connection, quality of the video (e.g., HD versus standard definition), length of the video, load on the server at the current time, etc. A game may be selected based at least in part on the calculated estimated wait time and the approximate time to finish the game. In some embodiments, one or more advertisements may be selected based on, for example, the type of video selected by the user (e.g., Sci-Fi, Action, Comedy, etc.), the search term(s) used by the user to search for the video, history of games played (e.g., what games, if any, has the user played previously), etc. The selected game and the one or more advertisements may be served to the user substantially simultaneously.

20 Claims, 6 Drawing Sheets

METHODS AND SYSTEMS FOR GRABBING VIDEO SURFERS' ATTENTION WHILE AWAITING DOWNLOAD

BACKGROUND

As internet use is increasing, users are spending an increasing amount of time searching for and viewing videos online. However, because viewing videos is data intensive, users spend a significant amount of time waiting for the videos to buffer or load. The time spent by the user waiting for videos to buffer is wasted, and may lead to the user's attention being drawn to another site.

There is a need for improved techniques in capturing and maintaining user attention, and for improved techniques in online advertising in video playback services.

SUMMARY

Some embodiments of the invention provide systems and methods in which an estimated wait time before a user selected video begins playing may be calculated. In one embodiment, a request from a user to play an online video may be received. In one embodiment, the user may select or request a video after searching for a video using a video service such as, for example, Yahoo! Video. The videos may be provided by and/or stored on one or more server computers. An amount of time the user will have to wait before the video begins playing may be calculated based on one or more factors such as, for example, speed of the connection, quality of the video (e.g., HD versus standard definition), length of the video, load on the server at the current time, etc. The factors listed are exemplary and may include other factors such as, for example, information which indicates time gaps due to changes in the speed of the connection, or other factors which may cause video playback to be delayed may be included in the computation of the estimated wait time. At least one game may be selected based at least in part on the calculated time. In some embodiments, the game may be selected based on the approximate time to complete the game. The approximate time may be, for example, an average time to complete the game. The approximate time to complete the game may be within a predetermined range and the calculated time may be within that predetermined range. For example, it may be predetermined that if the calculated wait time is between 0 and 20 seconds, then Tic Tac Toe should be selected because the average time to complete a game of Tic Tac Toe is 10 seconds. Thus, if a user's wait time is 15 seconds, Tic Tac Toe will be selected for that user because the wait time of 15 seconds and the average time to complete Tic Tac Toe are both within the range of 0 to 20 seconds.

The selected game may be served to the user. The game may be served to the user in a new browser window. Alternatively, the game may be served in the same window as the video. In some embodiments, one or more advertisements may be selected based at least in part on for example, the type of video selected by the user (e.g., Sci-Fi, Action, Comedy, etc.), the search term(s) used by the user to search for the video, history of games played (e.g., what games, if any, has the user played previously), etc. In some embodiments, the selected game and the one or more advertisements may be served to the user substantially simultaneously in a new browser window.

DETAILED DESCRIPTION

Figure 1:
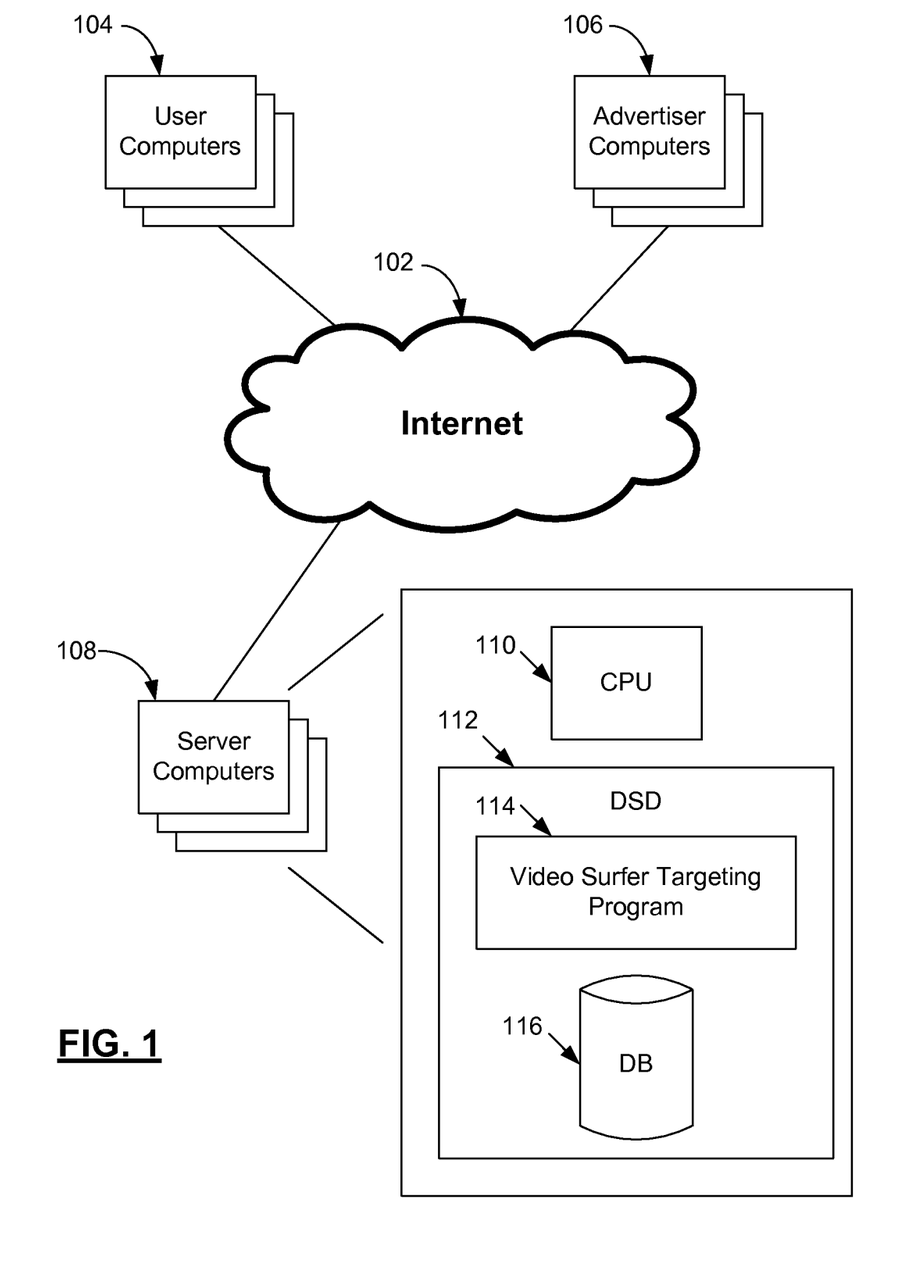
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers 104 may be or include desktop or laptop PCs, as well as, wireless, mobile, or handheld devices such as cell phones, PDAs, tablets, etc.

Each of the one or more computers 104, 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Video Surfer Targeting Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
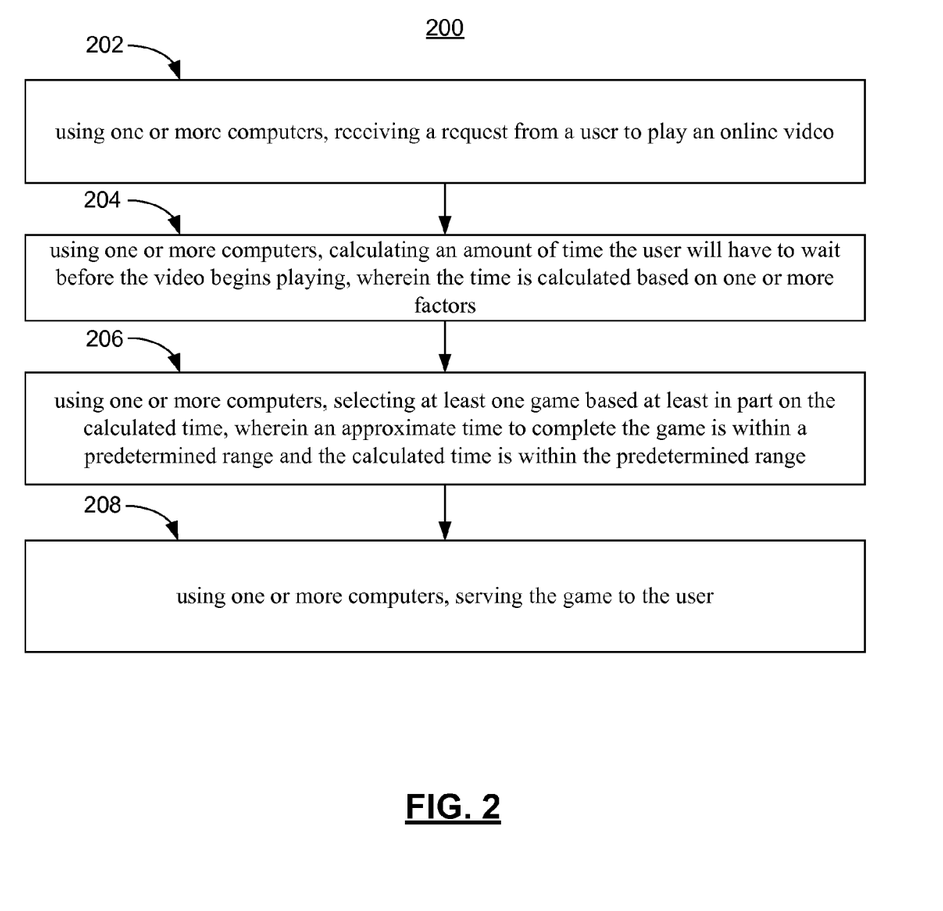
FIG. 2 is a flow diagram illustrating a method according to one embodiment of the invention.

FIG. 2 is a flow diagram illustrating a method 200 according to one embodiment of the invention. At step 202, using one or more computers, a request from a user to play an online video may be received. In one embodiment, the user may select or request a video after searching for a video using a video service such as, for example, Yahoo! Video. The videos may be provided by and/or stored on one or more server computers 108 (FIG. 1). At step 204, using one or more computers, an amount of time the user will have to wait before the video begins playing may be calculated. The time may be calculated based on one or more factors such as, for example, speed of the connection, quality of the video (e.g., HD versus standard definition), length of the video, load on the server at the current time, etc. The factors listed are exemplary and may include other factors such as, for example, information which indicates time gaps due to changes in the speed of the connection, or other factors which may cause video playback to be delayed may be included in the computation of the estimated wait time. At step 206, using one or more computers, at least one game may be selected based at least in part on the calculated time. In some embodiments, the game may be selected based on the approximate time to complete the game. The approximate time may be, for example, an average time to complete the game. It should be noted that, other measures may be used to select the game, such as for example, the median time to complete the game. The approximate time to complete the game may be within a predetermined range and the calculated time may be within that predetermined range. For example, it may be predetermined that if the calculated wait time is between 0 and 20 seconds, then Tic Tac Toe should be selected because the average time to complete a game of Tic Tac Toe is 10 seconds. Thus, if a user's wait time is 15 seconds, Tic Tac Toe will be selected for that user because the wait time of 15 seconds and the average time to complete Tic Tac Toe are both within the range of 0 to 20 seconds.

At step 208, using one or more computers, the selected game may be served to the user. The game may be served to the user in a new browser window. Alternatively, the game may be served in the same window as the video.

Figure 3:
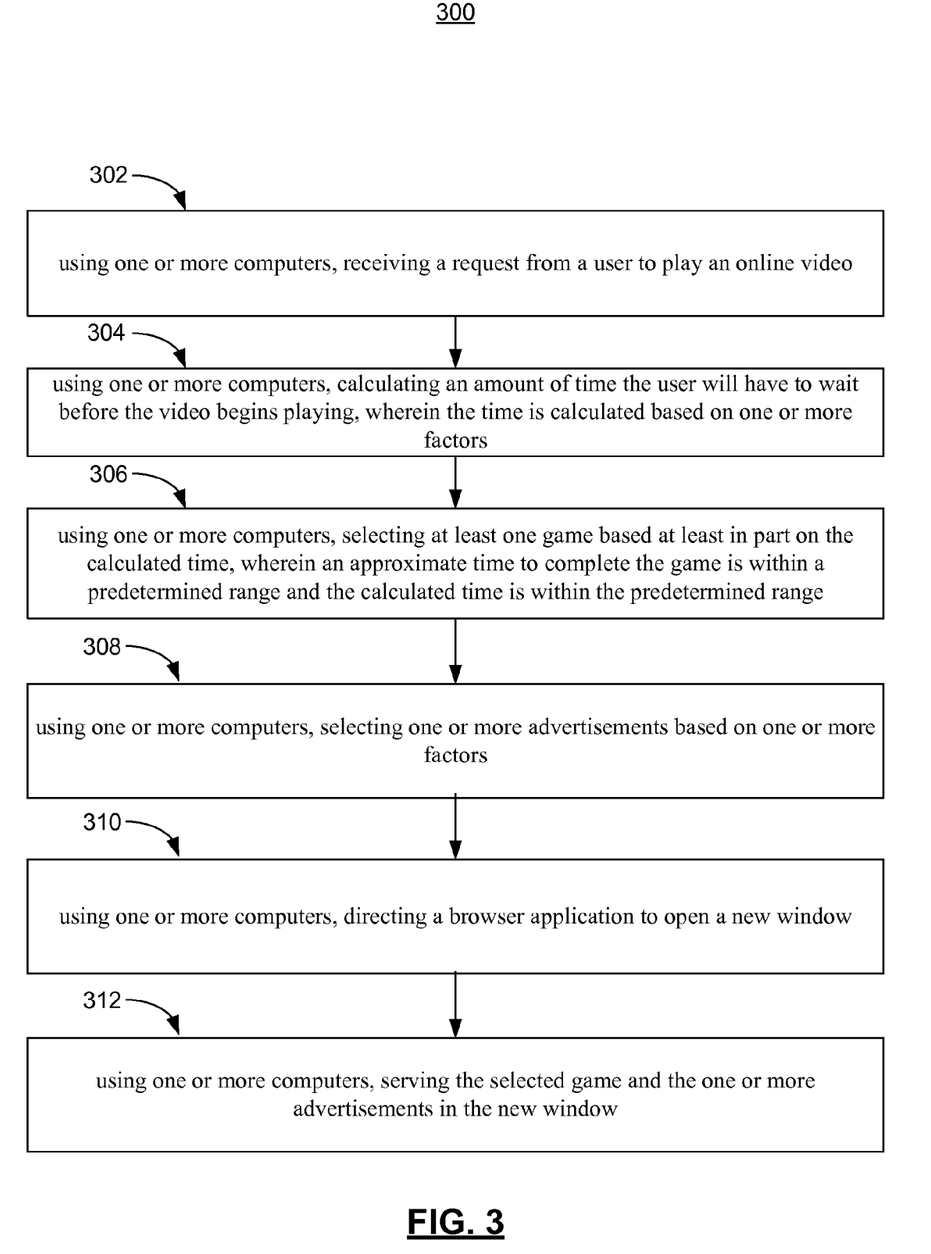
FIG. 3 is a flow diagram illustrating a method according to one embodiment of the invention.

FIG. 3 is a flow diagram illustrating a method 300 according to one embodiment of the invention. At step 302, using one or more computers, a request from a user to play an online video may be received. In one embodiment, the user may select or request a video after searching for a video using a video service such as, for example, Yahoo! Video. The videos may be provided by and/or stored on one or more server computers 108 (FIG. 1). At step 304, using one or more computers, an amount of time the user will have to wait before the video begins playing may be calculated. The time may be calculated based on one or more factors such as, for example, speed of the connection, quality of the video (e.g., HD versus standard definition), length of the video, load on the server at the current time, etc. The factors listed are exemplary and may include other factors such as, for example, information which indicates time gaps due to changes in the speed of the connection, or other factors which may cause video playback to be delayed may be included in the computation of the estimated wait time.

At step 306, using one or more computers, at least one game may be selected based at least in part on the calculated time. In some embodiments, the game may be selected based on the approximate time to complete the game. The approximate time may be, for example, an average time to complete the game. At step 308 using one or more computers, one or more advertisements may be selected based on one or more factors. The advertisements may be selected based on for example, the type of video selected by the user (e.g., Sci-Fi, Action, Comedy, etc.), the search term(s) used by the user to search for the video, history of games played (e.g., what games, if any, has the user played previously), etc. At step 310, using one or more computers, a browser application running on, for example, the user's computing device (e.g., PC, smartphone, tablet, etc.) may be directed to open a new browser window. At step 312, using one or more computers, the selected game and the one or more advertisements may be served to the user in the new browser window. The advertisement(s) and the game may be served to the user substantially simultaneously. Alternatively, the advertisement may be displayed before the game, or the game may be displayed before the advertisement.

Figure 4:
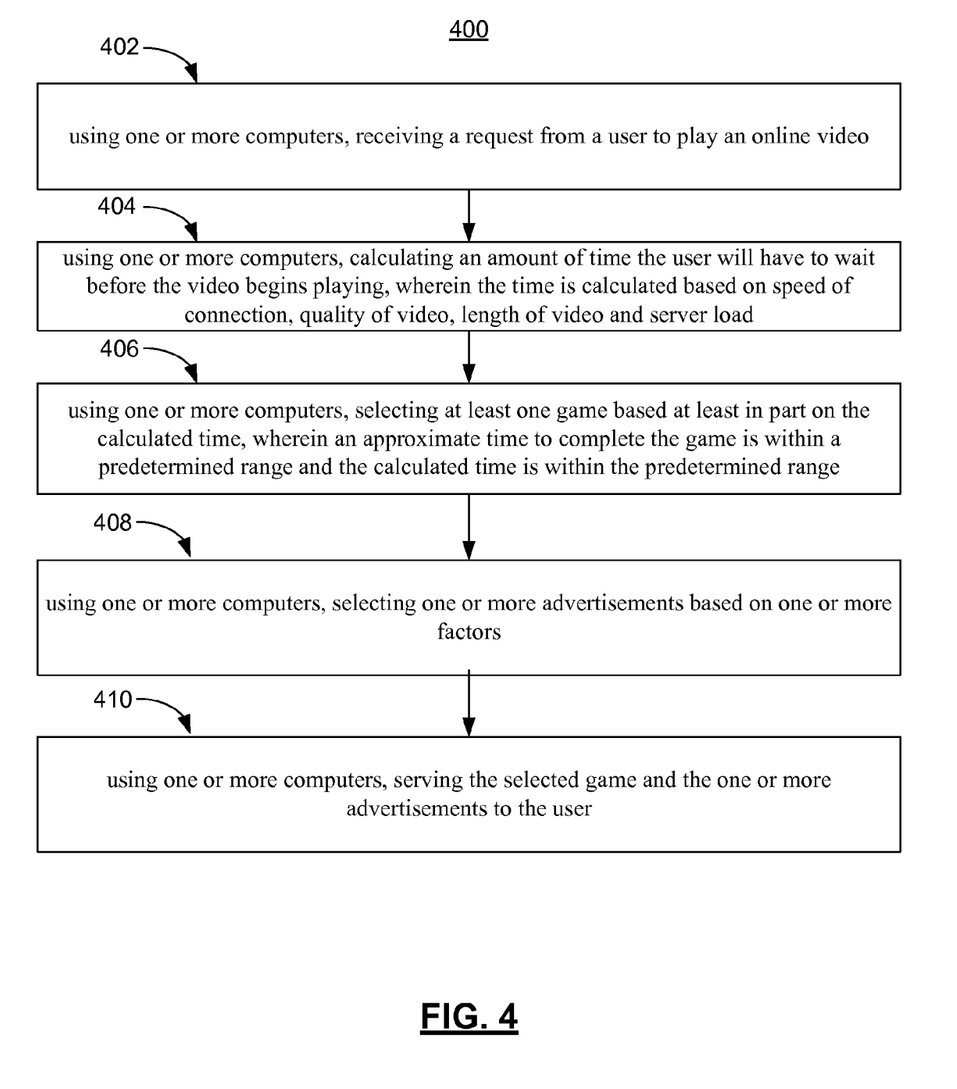
FIG. 4 is a flow diagram illustrating a method according to one embodiment of the invention.

FIG. 4 is a flow diagram illustrating a method 400 according to one embodiment of the invention. At step 402, using one or more computers, a request from a user to play an online video may be received. The videos may be provided by and/or stored on one or more server computers 108 (FIG. 1).

At step 404, using one or more computers, an amount of time the user will have to wait before the video begins playing may be calculated. The time may be calculated based on one or more factors such as, for example, speed of the connection, quality of the video (e.g., HD versus standard definition), length of the video, load on the server at the current time, etc.

At step 406, using one or more computers, at least one game may be selected based at least in part on the calculated time. In some embodiments, the game may be selected based on the approximate time to complete the game. The approximate time may be, for example, an average time to complete the game. It should be noted that, other measures may be used to select the game, such as for example, the median time to complete the game. The approximate time to complete the game may be within a predetermined range and the calculated time may be within that predetermined range. For example, it may be predetermined that if the calculated wait time is between 0 and 20 seconds, then Tic Tac Toe should be selected because the average time to complete a game of Tic Tac Toe is 10 seconds. Thus, if a user's wait time is 15 seconds, Tic Tac Toe will be selected for that user because the wait time of 15 seconds and the average time to complete Tic Tac Toe are both within the range of 0 to 20 seconds.

At step 408 using one or more computers, one or more advertisements may be selected based on one or more factors. The advertisements may be selected based on for example, the type of video selected by the user (e.g., Sci-Fi, Action, Comedy, etc.), the search term(s) used by the user to search for the video, history of games played (e.g., what games, if any, has the user played previously), etc. At step 410, using one or more computers, the selected game and the one or more advertisements may be served to the user. The advertisement(s) and the game may be served to the user substantially simultaneously. For example, the advertisement(s) and the game may be served to the user in a new browser window. Alternatively, the advertisement(s) and the game may be served to the user in the same window as the selected video.

Figure 5:
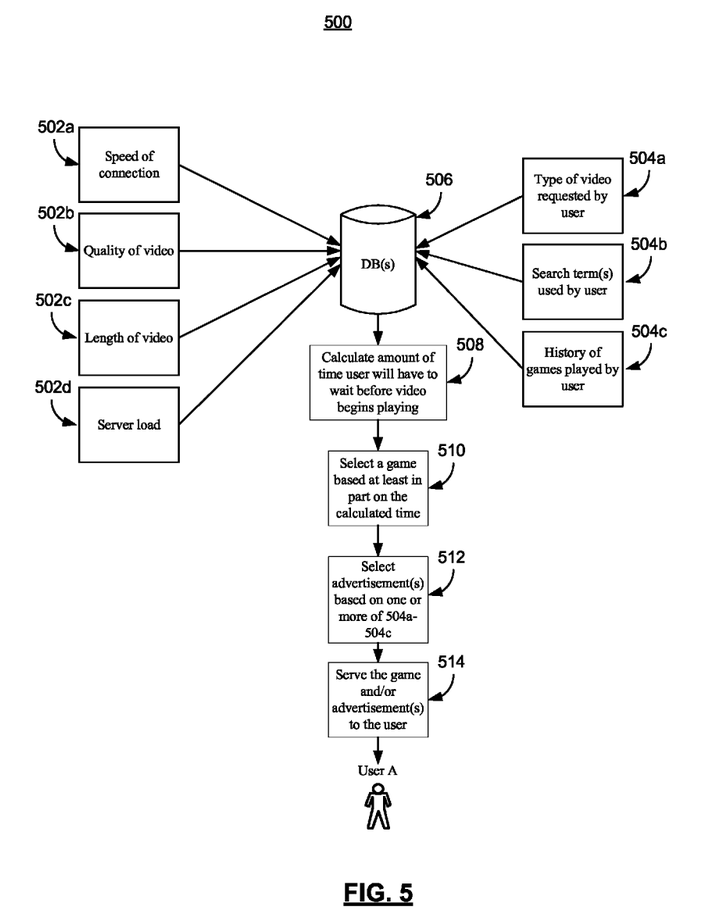
FIG. 5 is a block diagram illustrating one embodiment of the invention.

FIG. 5 is a block diagram 500 illustrating one embodiment of the invention. One or more data stores or databases 506 are depicted. Various types of information are stored in the database 506. In particular, types of depicted information stored in the database 506 include, potentially among many other types of information, speed of the connection 502a, quality of the video (e.g., HD versus standard definition) 502b, length of the video 502c, load on the server 502d, etc. The types of information depicted in FIG. 5 is exemplary and may include other information such as, for example, information which indicates time gaps due to changes in the speed of the connection, or other factors which may cause video playback to be delayed. In addition, database 506 may store information relating to the user such as for example, type of video requested by the user 504a (e.g., Sci-Fi, Action, Comedy, etc.), search term(s) used by the user to search for the requested or selected video 504b, and history of games previously played by the user 504c.

As depicted in block 508, an amount of time the user will have to wait before the video begins playing may be calculated. The estimated wait time may be calculated using one or more of 502a-502d. In addition, other factors may be accounted for in calculating the estimated wait time. For example, the estimated wait time may be calculated using the formula:

EstimatedWaitTime=(size of video/connection speed)
*100+(server load*common delays)+time gaps+
other factors that may cause video playback to be
delayed                                                      Equation 1

In some embodiments, factors or other utilized information may include the following:

Speed of connection: this may represent the speed of the Internet connection that at the client. This may impact the rate of bytes per second that are transferred.

Quality of video: this may be the quality of the video to show (e.g., standerd, HD, super HD, etc.)

Length of Video: this may be the time length of the video.

Delays from start: This may address how long the delay is before the start of the Video.

Time Gaps The Gaps of Time due to the change of speed of connection and delays

Load on server: this may represent how much load is on the server to serve the videos with delays to consider.

Block 510 represents selection of at least one game based at least in part on the estimated wait time. The game may be selected based on the approximate time to complete the game. The approximate time may be, for example, an average time to complete the game. It should be noted that, other measures may be used to select the game, such as for example, the median time to complete the game. The approximate time to complete the game may be within a predetermined range and the calculated time may be within that predetermined range. For example, it may be predetermined that if the calculated wait time is between approximately 1 minute and approximately 10 minutes, then a card game such as Solitaire should be selected because the average time to complete a game of Solitaire is approximately 8 minutes. Thus, if a user's wait time is 9 minutes, Solitaire will be selected for that user because the wait time of 9 minutes and the average time to complete Solitaire (8 minutes) are both within the range of approximately 1 minute to approximately 10 minutes.

As depicted in block 512, one or more advertisements may be selected based at least in part on 504a-504c. Alternatively, or in addition, advertisements may also be selected based on, for example, the user's profile, internet search history, the user's social networking profile, etc. Block 514 represents serving of the game and/or advertisement(s) to the user. The advertisement(s) and the game may be served to the user substantially simultaneously. For example, the advertisement(s) and the game may be served to the user in a new browser window. Alternatively, the advertisement(s) and the game may be served to the user in the same window as the selected video.

Figure 6:
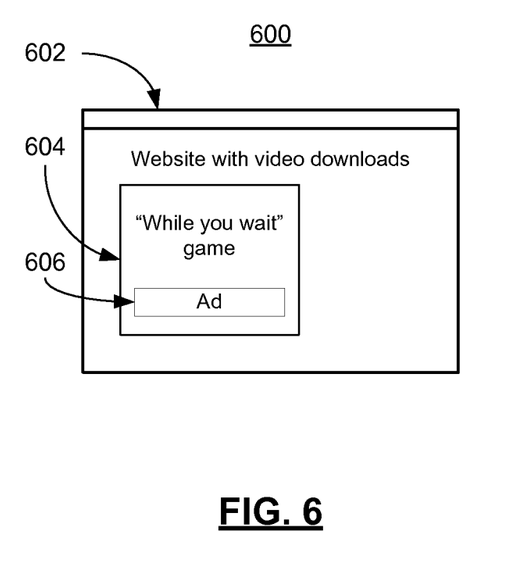
FIG. 6 depicts a screen shot illustrating one embodiment of the invention.

FIG. 6 depicts a screen shot 600 illustrating one embodiment of the invention. As depicted, a "While you wait" type game 604 may be presented to a user, such as while the user awaits a requested video download at a Web site 602. One or more ads 604 may also be presented, such as with, or associated with, the game 604.

Some embodiments of the invention help provide advertisers with information and tools to allow them to better compete for user attention by utilizing and referencing topics of interest. Advertisers can benefit, for example, from, for a particular target audience of interest to the advertiser, information that allows timely and effective targeting. One particular target audience that may be of interest to advertisers is users who are waiting for videos to buffer or load. One way of targeting users who are waiting for videos to buffer is to capture their attention using games. Various embodiments of the invention may be used to capture user attention and target users with advertisements as depicted in the following exemplary scenario.

User A searches for video titled "star-man" using a search engine, such as Yahoo!. The search results are displayed. User A selects a video from the displayed search results. The estimated wait time is calculated to be approximately 15 seconds. The approximately 15 second wait time is determined to correspond with the Tic Tac Toe game. User A is redirected to a video service, such as for example, Yahoo! Video where the user will be able to watch the video. As the video is loading, a new browser window is opened which includes the Tic Tac Toe game. Because the user used the search term "space man", it may be determined that the user is interested in space. Thus, an advertisement for telescopes is selected and displayed in the browser window which includes the game. User A will see the advertisement while playing the game as the video loads. Embodiments of the invention may advantageously increase the amount of time users spend on the video site, increase the number of targeted advertisements viewed by users, increase advertising revenue for the site and increase the use of search engines to search for videos.

While the invention is described with reference to the above drawings, the drawings are intended to be illustrative, and the invention contemplates other embodiments within the spirit of the invention.

The invention claimed is:

1. A method comprising:
   at a server computer system comprising processor and memory:
   receiving a request from a user to play an online video;
   calculating an estimated range of time that the user may have to wait before the video begins playing;
   selecting at least one game based at least in part on an approximate time to complete the game being within the estimated range of time that the user may have to wait before the video begins playing, wherein the approximate time to complete the game is calculated based on an average time to complete the game; and
   serving the at least one game to the user.

2. The method of claim 1, wherein the estimated range of time is calculated based on one or more factors including: speed of connection, quality of video, length of video and server load.

3. The method of claim 1, further comprising:
   selecting one or more advertisements based on one or more advertisement selection factors; and
   serving the one or more advertisements to the user.

4. The method of claim 3, wherein the one or more advertisement selection factors include: a type of the online video requested by the user and a search term used by the user to search for the video.

5. The method of claim 1, wherein the approximate time to complete the game is based on an average time to complete the game.

6. The method of claim 1, wherein the game is displayed in a new browser window.

7. The method of claim 6, wherein the one or more advertisements are displayed in the browser window.

8. The method of claim 6, further comprising:
   closing the browser window upon completion of the game.

9. The method of claim 1, further comprising:
   selecting one or more advertisements based on a history of games played by the user; and
   serving the one or more advertisements to the user.

10. A system comprising:
    one or more server computers coupled to a network; and
    one or more databases coupled to the one or more server computers;

wherein the one or more server computers are configured for:
receiving a request from a user to play an online video;
calculating an estimated range of time that the user may have to wait before the video begins playing;
selecting at least one game based at least in part on an approximate time to complete the game being within the estimated range of time that the user may have to wait before the video begins playing, wherein the approximate time to complete the game is calculated based on an average time to complete the game; and
serving the at least one game to the user.

11. The system of claim 10, wherein the estimated range of time is calculated based on one or more factors including: speed of connection, quality of video, length of video and server load.

12. The system of claim 10, wherein the one or more server computers are further configured to:
select one or more advertisements based on one or more advertisement selection factors; and
serve the one or more advertisements to the user.

13. The system of claim 12, wherein the one or more-advertisement selection factors include: a type of the online video requested by the user and a search term used by the user to search for the video.

14. The system of claim 10, wherein the approximate time to complete the game is based on an average time to complete the game.

15. The system of claim 10, wherein the game is displayed in a new browser window.

16. The system of claim 15, wherein the one or more advertisements are displayed in the browser window.

17. The system of claim 15, wherein the one or more server computers are further configured to:
close the browser window upon completion of the game by the user.

18. The system of claim 10, wherein the approximate time to complete the game is based on a median time to complete the game.

19. The system of claim 10, wherein the one or more servers are further configured to:
select one or more advertisements based on a history of games played by the user; and
serve the one or more advertisements to the user.

20. A non-transitory computer readable medium containing instructions for executing a method comprising:
receiving a request from a user to play an online video, wherein the request from the user includes search terms used to search for the online video;
calculating, based on one or more factors including quality of the requested online video and length of the requested online video, an estimated range of time that the user may have to wait before the online video begins playing;
selecting at least one game based at least in part on an approximate time to complete the game, such that the approximate time to complete the game is less than or equal to the estimated range of time that the user may have to wait before the video begins playing;
determining user topics of interest based on the search terms; and
selecting one or more advertisements based on one or more advertisement selection factors including the search terms in the received request, the determined user topics of interest, and a history of games played by the user, wherein the advertisement is related to the determined user topics of interest; and
simultaneously serving the selected game and the one or more advertisements to the user such that the user sees the advertisement while playing the game.

* * * * *